Figure 1:
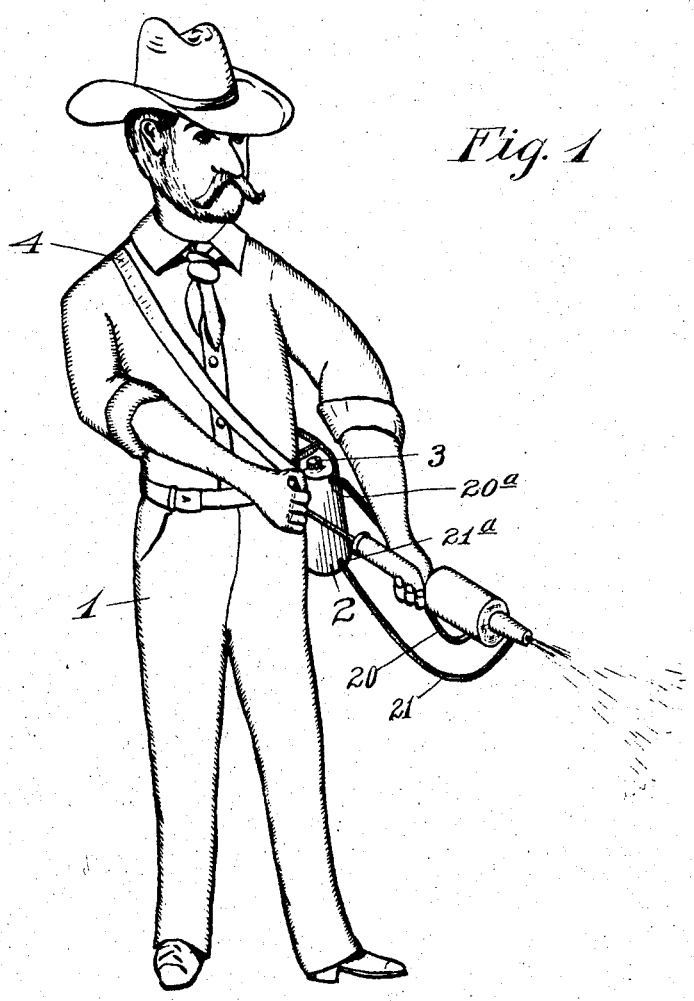

No. 772,454. PATENTED OCT. 18, 1904.
P. BRANDT.
POISON DISTRIBUTER.
APPLICATION FILED JUNE 14, 1904.
NO MODEL. 2 SHEETS—SHEET 1.

Witnesses
E. W. Jeppson
A. H. Opsahl

Inventor.
Petter Brandt.
By his Attorneys.
Williamson & Merchant

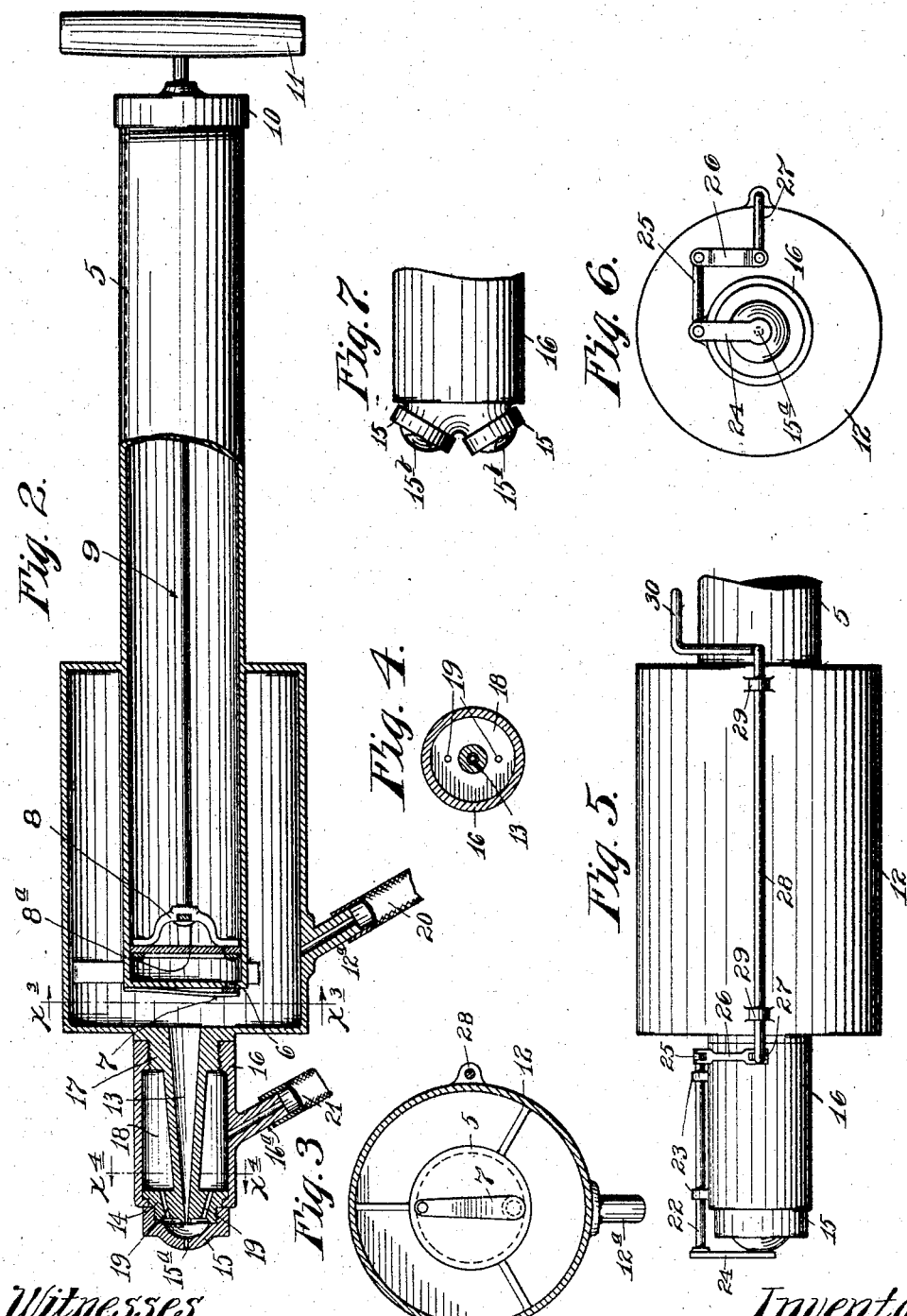

No. 772,454.

Patented October 18, 1904.

UNITED STATES PATENT OFFICE.

PETTER BRANDT, OF CHISAGO CITY, MINNESOTA.

POISON-DISTRIBUTER.

SPECIFICATION forming part of Letters Patent No. 772,454, dated October 18, 1904.

Application filed June 14, 1904. Serial No. 212,464. (No model.)

*To all whom it may concern:*

Be it known that I, PETTER BRANDT, a citizen of the United States, residing at Chisago City, in the county of Chisago and State of Minnesota, have invented certain new and useful Improvements in Poison-Distributers; and I do hereby declare the following to be a full, clear, and exact description of the invention, such as will enable others skilled in the art to which it appertains to make and use the same.

My invention has for its object to provide a simple and efficient poison-distributing device adapted to be carried by a person and to be used to spray plants with a liquid solution which will serve to kill noxious bugs and insects.

To the above ends the invention consists of the novel devices and combinations of devices hereinafter described, and defined in the claims.

The invention is illustrated in the accompanying drawings, wherein like characters indicate like parts throughout the several views.

Figure 1 is perspective view illustrating the figure of a man and showing my improved poison-distributer in use. Fig. 2 is a view, partly in plan and partly in vertical section, showing the combined pump and spraying device which constitutes the principal feature of my invention. Fig. 3 is a transverse section on the line $x^3\ x^3$ of Fig. 2. Fig. 4 is a transverse section on the line $x^4\ x^4$ of Fig. 2. Fig. 5 is a side elevation of the combined pump and spraying device, some parts being broken away. Fig. 6 is a front elevation of the parts shown in Fig. 5, and Fig. 7 is a detail view illustrating a modified form of the spraying-nozzle.

The numeral 1 indicates the figure of a man. The numeral 2 indicates a tank, preferably of light sheet metal, which tank is adapted to contain the poisonous liquid which is to be sprayed upon the plants. At the top of the tank 2 is a removable cap 3, that closes a neck which when opened admits the poisonous liquid to be introduced into the tank. The tank is preferably carried from the shoulders, substantially as shown in Fig. 1, and for this purpose is provided with a shoulder-strap 4.

The numeral 5 indicates the barrel of an air-pump, the same having at its discharge end an air-outlet passage 6, which is closed against an inflow of air by a check-valve 7, applied to the said end of the barrel 5. Working within the barrel 5 is a pump-piston 8, having a stem 9, which works outward through a cap 10 on the outer end of the barrel 5 and, as shown, is terminated in a transverse handpiece 11. The stem 9 works in the head 10 in the usual way under sufficient clearance to permit a quite free flow of air into the barrel under the pumping action. The intermediate portion $8^a$ of the piston-head 8 works as a valve, which closes against the body of the head 8 under a working stroke thereof, but opens under a return stroke. In other words, the two valves 7 and $8^a$ operate in alternate order.

Rigidly secured to and surrounding the discharge end portion of the barrel 5 is an air-reservoir 12, which at its projecting end is formed with a discharge nipple or spout 13. The projecting end of the neck 13 is expanded to form a head 14, onto which is screwed a spraying-nozzle 15. A sleeve 16 surrounds the neck 13, has screw-threaded engagement with the shank thereof at 17, and has an inturned flange at its other end, which is pressed against a flange of the head 14 and the margin of the spraying-nozzle 15. An annular water-chamber 18 is thus formed within the sleeve 16 and around the neck 13. A plurality of small perforations 19 lead from the water-chamber 18 through the head 14 and into the cavity formed within the spraying-nozzle 15. The air-chamber 12 has a neck $12^a$, and the sleeve 16 has a neck $16^a$, to which necks, respectively, flexible tubes 20 and 21 are attached. The other end of the tube 20 is connected to a neck $20^a$, which opens into the upper portion of the tank 2, while the other end of the tube 21 is connected to a short neck $21^a$, that opens from the lower portion of said tank.

The spraying-nozzle shown in Fig. 2 is intended to throw but a single spray, and hence has a single centrally-located discharge-orifice $15^a$. The spraying-nozzle illustrated in Fig. 7 is intended to throw two sprays at angles diverging from each other, and hence is provided with two diverging discharge-orifices $15^b$.

To open and close the discharge-orifice $15^a$ of the spraying-nozzle 15 at will, I provide valve mechanism which may be conveniently arranged as follows: The numeral 22 indicates a short rock-shaft journaled in bearings 23 on the sleeve 16 and provided at its outer end with an arm 24, which operates as a valve to open and close the orifice $15^a$. At its inner end the shaft 22 is provided with an arm 25, which is connected by a link 26 to an arm 27 of a second rock-shaft 28, which latter rock-shaft is journaled in bearings 29 on the exterior of the air-reservoir 12. The rear end of this rock-shaft 28 is terminated in a crank-like finger-piece which stands in position to be readily engaged by the hand which is used to hold the pump-barrel 5.

The manner of operating the spraying device is probably obvious, and is clearly illustrated in Fig. 1. As is evident, when the piston 8 is moved outward air will be drawn into the pump-barrel 5 ahead of the piston. Then under an operative stroke of the piston in a reverse direction air will be forced out of the pump-barrel into the air-reservoir 12, and from thence will pass, in part, into the tank 2 through the tube 20 and will be discharged, in part, through the neck 13 and through the discharge orifice or orifices of the spraying-nozzle 15. The pressure put upon the poisonous liquid within the tank 2 will cause the same to flow through the tube 21 into the commingling-chamber 18 and from thence by the combined action of the pressure back of the same and by the suction produced by the discharge of air from the neck 13 and spraying-nozzle 15 will be taken up in small quantities and commingled with the air which is discharged from said nozzle under an atomizing action. In this way a fine spray of the poisonous liquid is generated, and by the apparatus may be delivered onto the plants, shrubs, or trees at the points where desired.

It will of course be understood that the air-pump must be kept in almost continuous action; but it should also be understood that the auxiliary supply of air stored in the tank 2 will afford a supply of air under pressure to maintain a continuous spraying action while the pump-piston is given its return stroke and, in fact, for some little time while the pump is out of action.

By means of the valve 24 and its operating connections the discharge of the spray of the commingled air and water from the spraying-nozzle may be cut off in an instant, thereby holding the compressed charge of air for subsequent use and preventing waste of the poisonous liquid in passing from one place to another where the spray is not required.

The device above described, while of small cost, is easy to manipulate and has in practice been found extremely efficient for the purposes had in view. The said device it will of course be understood is capable of modification within the scope of my invention as herein set forth and claimed.

What I claim, and desire to secure by Letters Patent of the United States, is as follows:

1. In a spraying device of the character described, the combination of a hand-operated pump, of an air-reservoir surrounding a portion of the barrel of said pump, and communicating therewith, an air-discharge neck projecting from said air-reservoir, and provided at its outer end with a spraying-nozzle, a water-chamber surrounding said neck and communicating with the interior of said nozzle, a tank adapted to contain the liquid to be sprayed, and tube connections, one leading from said air-reservoir to said tank, and the other leading from the lower portion of said tank to the water-chamber surrounding said air-discharge neck, substantially as described.

2. The combination with a tank 2 having a shoulder-strap 4, of an air-pump having a barrel 5, a portion of which serves as a hand-piece, the air-reservoir 12, secured to and surrounding a portion of said pump-barrel 5, and having the discharge-neck 13, terminating in the head 14, having perforations 19, the perforated spraying-nozzle 15 applied to said head 14, the sleeve 16 surrounding said head 13 and affording the chamber 18, the tube 20 connecting said air-reservoir 12 to said tank 2, and the tube 21 connecting the lower portion of said tank 2 with said chamber 18, substantially as described.

In testimony whereof I affix my signature in presence of two witnesses.

PETTER BRANDT.

Witnesses:
R. C. MABEY,
F. D. MERCHANT.